UNITED STATES PATENT OFFICE.

ALMER McDUFFIE McAFEE, OF NEW YORK, N. Y.

RECOVERY OF ALUMINUM CHLORID.

1,202,081.   Specification of Letters Patent.   Patented Oct. 24, 1916.

No Drawing.   Application filed March 2, 1915.   Serial No. 11,547.

*To all whom it may concern:*

Be it known that I, ALMER McDUFFIE McAFEE, a citizen of the United States, residing at New York, in the county of New York and State of New York, have invented certain new and useful Improvements in Recovery of Aluminum Chlorid, of which the following is a specification.

This invention relates to the recovery of aluminum chlorid; and it comprises a method of recovering active aluminum chlorid from residues arising from the treatment of oil therewith and containing aluminum chlorid in inactive form, wherein such residues are treated with an organic solvent, as by extracting the residues with an organic solvent to produce a solution of such aluminum chlorid, the solvent being afterward separated and the aluminum chlorid recovered; all as more fully hereinafter set forth and as claimed.

It has been found that aluminum chlorid is a useful catalytic agent in various processes of converting, stabilizing, purifying and improving mineral oils. For example, high boiling mineral oils may be heated with aluminum chlorid and converted into gasolene and other low boiling oils; this conversion being either total or partial. Asphaltic low grade crude petroleum may, for instance, receive an addition of aluminum chlorid and be distilled therewith. If the distillation is carried on to the end, *i. e.*, to the production of a coky residue, some 85 per cent. of the oil, under proper conditions of operation, may be converted into gasolene, or into gasolene and kerosene; or, if the distillation be interrupted after a portion, but not all, of the oil has been converted into gasolene and distilled off, the residual oil will be found much improved in quality, being substantially free of unsaturated compounds, of asphalt, etc. These reactions take place at a comparatively high temperature; a temperature at which the mixture of oil and aluminum chlorid will boil freely, say, around 500–550° F. By exercising the action of the aluminum chlorid on the oil at lower temperatures other effects may be secured. For example, lubricating oil of low grade may be warmed at about 150° F. with aluminum chlorid for some hours with the result of destroying asphaltic constituents and converting unsaturated bodies into saturated; thereby giving the oil a better color and improving its stability or keeping qualities. The list of uses of aluminum chlorid might be extended indefinitely. It is found that in all these processes of treating petroleum oils with aluminum chlorid the catalytic activity of the aluminum chlorid is not permanent, but after a time its activity diminishes and ultimately ceases. For example, a charge of lubricating oil may be warmed with 5 per cent. of anhydrous aluminum chlorid for 6 to 8 hours and then be allowed to cool. Most of the aluminum chlorid will deposit as a sludge. A further quantity of oil may now be treated in the same way with this chlorid sludge and so on until 5 or 6 portions of oil have been so treated. Each successive charge of oil will be less affected by the aluminum chlorid, and finally the aluminum chlorid will be found in the bottom of the treating vessel on cooling the oil as a coky mass—a mass of free carbon containing some oil and also containing the aluminum chlorid. Similar coky sludges are obtained in producing gasolene from high boiling petroleum oils in the manner described. Nothing is known as to the condition in which the aluminum chlorid exists in these coky residues. Where the oils are free from moisture (moisture breaks up aluminum chlorid into alumina and hydrochloric acid) the aluminum chlorid apparently still exists as aluminum chlorid. But it no longer has its original activity. It is apparently bound or fixed in some way in the coky mass. After burning off residual oil the coky mass may be heated up to a distinct red heat without evolution of any substantial amount of aluminum chlorid although aluminum chlorid normally, that is by itself, will volatilize at 365° F. It may be that it is in a state of combination with heavy or with pitchy hydrocarbons in the coke or it may be that it is adsorbed by the coky carbon in some manner. Whatever the state in which it exists, the aluminum chlorid cannot be found by the usual tests although analysis of the residue will show the presence of aluminum and chlorin in the correct proportions to form aluminum chlorid. I have however found, rather unexpectedly, that although this aluminum chlorid in the residues does not have its ordinary properties, it can be restored to its usual properties by wetting or contacting with organic solvents. The nature of the action which the organic solvent exercises I am not able to say; and content myself with noting the result. For example in such a coky residue from which aluminum chlorid cannot be removed by heating and in which it no longer exercises any converting action upon oil, it can be restored to activity and revivified by simply wetting the residue with chloroform and drying to drive off the chloroform. This activating or revivifying property of organic solvents seems to be a general property of such solvents. Its existence allows a convenient method of activating and simultaneously recovering aluminum chlorid. While, as stated, it suffices to wet the coky residue with such a solvent and drive the solvent off again to restore activity to such residue, yet it is more convenient to use enough solvent to form a solution, remove this solution and recover aluminum chlorid from it. The residue left after evaporating or distilling the solvent from the solution or extract so obtained is aluminum chlorid having its normal activity and properties. It usually also contains more or less other matters extracted by the solvent but these do not interfere with the catalytic activity of the aluminum chlorid for the stated purpose. A great variety of organic solvents have the property of thus extracting this, so to speak, "fixed" aluminum chlorid from these residues and of restoring to it its normal activity. Ethyl and methyl alcohol are good and advantageous activating solvents but as these alcohols occur in commerce they contain more or less water and in recovering the aluminum chlorid from an alcoholic solution some loss is caused by conversion into alumina and hydrochloric acid. This loss may be avoided by using the anhydrous or absolute alcohols. Chloroform and other chlorinated hydrocarbons are also good activating solvents for this purpose. They possess the further advantage over the alcohols that they are little affected by the chemical activity of the aluminum chlorid; that is, in evaporating down a chloroform extract in order to recover aluminum chlorid there is little action of the aluminum chlorid on the solvent. Carbon tetrachlorid is as good a solvent as chloroform for this purpose and is even less affected by the catalytic properties of the aluminum chlorid. Another advantageous class of solvents for this purpose are the low boiling petroleum oils, such as petroleum ether, gasolene and kerosene. While the extracting and revivifying power of these petroleum hydrocarbons on aluminum chlorid is markedly less than that of the alcohols, or the chlorin compounds just stated, yet they may be employed for the present purpose since the solvent may be repeatedly applied to the coky residue; such coky residue being extracted with a solvent. The low boiling petroleum oils rich in naphthenes are also suitable. Benzol and low boiling tar oils may also be used.

Revivification or revivification and extraction may be performed in any suitable type of apparatus.

The coky residue may be extracted as it comes from an oil converting process, in which event the adhering oil will also be extracted and will mingle with the recovered aluminum chlorid. But as aluminum chlorid is ordinarily to be used with further portions of oil the presence of this oil is generally not disadvantageous. Or the coky residues may be burnt or roasted to free them of oil, for as stated, they may be heated to a distinct red heat without fear of loss of aluminum chlorid.

In a typical embodiment of the present invention, I may take an oily, coky or sludgy residue arising from a catalytic conversion or improvement of petroleum oils by aluminum chlorid, and roast it with a limited admission of air. The oil burns out leaving a dry carbonaceous mass containing the aluminum chlorid. This dry mass may now be treated with alcohol in any convenient manner. For example, it may be heated with the alcohol under a reflux condenser for a time and then the alcohol distilled off. The residue from this treatment, which will contain all the original carbon, as well as the aluminum chlorid, may be directly employed for converting oils. It is however better to combine the heating with the alcohol with an extracting treatment, as this not only gets rid of the carbon but gives the aluminum chlorid in concentrated form. The mass may, for this purpose, be treated with alcohol in any suitable form of extracting apparatus. Only a short extraction is required to remove all the aluminum chlorid. The carbonaceous residue may be used for fuel, for making carbon articles, etc. The alcoholic extract may now be distilled to recover the alcohol. The residue in the still will be mainly active aluminum chlorid with some alumina; an amount of alumina corresponding, roughly, to the amount of water present. With anhydrous alcohol this alumina does not form or occur. If chloroform or carbon tetrachlorid be used in lieu of alcohol, the residue will be mainly highly active, aluminum chlorid. It is generally somewhat discolored by the presence of pitchy hydrocarbons remaining in the residue after the roasting operation and removed by the solvent; but the presence of these hydrocarbons and the discoloration do not injuriously affect it in any way. After evaporating off the alcohol or other solvent, the residue in the still may be directly used for converting or improving petroleum oils.

Instead of first roasting the coky or sludgy residue in the manner just described, it may be directly extracted. In this event it is better to use a solvent in which oil is also soluble, such as a chlorinated hydrocarbon, or gasolene or the like, rather than alcohol. In so extracting, the oil of the residue will be extracted at the same time as the aluminum chlorid. On redistilling to recover the volatile organic solvent employed, this oil will remain behind with the aluminum chlorid.

What I claim is:—

1. In the treatment of coky or sludgy residue arising from the treatment of oil with anhydrous aluminum chlorid, the process of revivifying the aluminum chlorid which comprises exposing said residues to the action of a volatile organic solvent and then removing the solvent.

2. In the treatment of coky or sludgy residues arising from the treatment of oil with anhydrous aluminum chlorid, the process of revivifying the aluminum chlorid which comprises heating said residues with a volatile organic solvent and then removing the solvent.

3. In the treatment of coky or sludgy residues arising from the treatment of oil with anhydrous aluminum chlorid, the process of revivifying the aluminum chlorid which comprises extracting said residues with a volatile solvent and expelling the volatile solvent from the extract.

4. In the treatment of coky or sludgy residues arising from the treatment of oil with anhydrous aluminum chlorid, the process of revivifying the aluminum chlorid which comprises extracting an oil-containing residue with a volatile solvent and expelling the volatile solvent from said extract.

In testimony whereof, I affix my signature in the presence of two subscribing witnesses.

ALMER McDUFFIE McAFEE.

Witnesses:
K. P. McElroy,
George G. McDaniel.